(12) United States Patent
Gervais et al.

(10) Patent No.: US 9,729,886 B2
(45) Date of Patent: Aug. 8, 2017

(54) METHOD FOR LIMITING THE MEMORY REQUIRED FOR RECORDING AN AUDIO, IMAGE OR VIDEO FILE CREATED BY VIRTUE OF AN APPARATUS IN SAID APPARATUS

(71) Applicant: I-CES (INNOVATIVE COMPRESSION ENGINEERING SOLUTIONS), Paris (FR)

(72) Inventors: Than Marc-Eric Gervais, Paris (FR); Bruno Loubet, Paris (FR); Nicolas Bessous, Sartrouville (FR); Yves Guimiot, Conflans Saint Honorine (FR); Mickael Petitfils, Mitry Mory (FR); Sebastien Roques, Paris (FR)

(73) Assignee: Jean-Claude Colin, Versailles (FR)

( * ) Notice: Subject to any disclaimer, the term of this patent is extended or adjusted under 35 U.S.C. 154(b) by 0 days.

(21) Appl. No.: 14/441,736

(22) PCT Filed: Nov. 8, 2013

(86) PCT No.: PCT/FR2013/052679
§ 371 (c)(1),
(2) Date: May 8, 2015

(87) PCT Pub. No.: WO2014/072653
PCT Pub. Date: May 15, 2014

(65) Prior Publication Data
US 2015/0312576 A1 Oct. 29, 2015

(30) Foreign Application Priority Data
Nov. 9, 2012 (FR) .................... 12 60679

(51) Int. Cl.
*G06K 9/36* (2006.01)
*H04N 19/172* (2014.01)
(Continued)

(52) U.S. Cl.
CPC ......... *H04N 19/172* (2014.11); *H04N 19/126* (2014.11); *H04N 19/154* (2014.11);
(Continued)

(58) Field of Classification Search
CPC .. H04N 19/126; H04N 19/154; H04N 19/162; H04N 19/172; H04N 19/40; H04N 19/60
See application file for complete search history.

(56) References Cited

U.S. PATENT DOCUMENTS 6,825,876 B1 * 11/2004 Easwar .................. G06T 9/007
348/234
6,885,395 B1 * 4/2005 Rabbani ............... H04N 1/2112
348/231.1
(Continued)

FOREIGN PATENT DOCUMENTS

WO 02/087255 A2 10/2002

OTHER PUBLICATIONS

International Search Report, dated Mar. 11, 2014, from corresponding PCT application.

*Primary Examiner* — Li Liu
(74) *Attorney, Agent, or Firm* — Young & Thompson

(57) ABSTRACT

Method and apparatus for the digital encoding of a first raw file, the method includes:
- a first step of capturing the raw file, the raw file being an audio and/or image and/or video file;
- a second step of encoding the captured raw file into a second file, in a proprietary format (P); then,
- a third step for re-encoding the second file into a third file in a compatible format (C).

4 Claims, 1 Drawing Sheet

(51) Int. Cl.
*H04N 19/126* (2014.01)
*H04N 19/154* (2014.01)
*H04N 19/162* (2014.01)
*H04N 19/40* (2014.01)
*H04N 19/60* (2014.01)

(52) U.S. Cl.
CPC ........... *H04N 19/162* (2014.11); *H04N 19/40* (2014.11); *H04N 19/60* (2014.11)

(56) References Cited

U.S. PATENT DOCUMENTS

| | | | |
|---|---|---|---|
| 9,280,813 B2* | 3/2016 | Liu | G06T 7/0002 |
| 2001/0036231 A1* | 11/2001 | Easwar | G06T 9/007 375/240.19 |
| 2003/0206597 A1 | 11/2003 | Kolarov et al. | |
| 2004/0008897 A1* | 1/2004 | Easwar | H04N 19/40 382/250 |
| 2005/0018908 A1* | 1/2005 | Johannesson | H04N 19/126 382/232 |
| 2007/0047659 A1 | 3/2007 | Aleksic | |
| 2009/0141992 A1* | 6/2009 | Coulombe | G06T 9/004 382/235 |
| 2009/0226102 A1 | 9/2009 | Huang et al. | |
| 2012/0134417 A1* | 5/2012 | Layachi | H04N 19/00472 375/240.16 |
| 2012/0177109 A1* | 7/2012 | Ye | H04N 19/197 375/240.03 |
| 2012/0294355 A1* | 11/2012 | Holcomb | H04N 19/172 375/240.03 |
| 2013/0155295 A1* | 6/2013 | Bekiares | H04N 5/23206 348/240.99 |

* cited by examiner

METHOD FOR LIMITING THE MEMORY REQUIRED FOR RECORDING AN AUDIO, IMAGE OR VIDEO FILE CREATED BY VIRTUE OF AN APPARATUS IN SAID APPARATUS

This invention relates to the field of media encoding, in particular audio, image or video media, in the form of digital files. It relates more particularly to a method for reducing the size of these files, for the purposes of recording them.

BACKGROUND OF THE INVENTION

When a user captures a video, sounds, or when the user takes a photograph, this capture takes the form of a digital file which is saved in the memory of the apparatus which has allowed for the capture. Without the user being generally aware, the file is encoded beforehand in such a way that it is recorded in a compressed format, in order to limit its size and the quantity of memory required to save it. The size of such a compressed file is of upmost importance when the latter has to be saved in a memory of low capacity, for example that of a portable apparatus; this is in particular the case for digital cameras, portable telephones, or "general public" video cameras.

The compression format is generally chosen according to its compatibility with applications that in particular allow it to be read or post-processed, directly on the apparatus or on an apparatus to which the file has been transferred. However, the compatible and widely distributed formats are generally frozen, or change little, in order to maintain this compatibility; They as such do not benefit from the latest advances in terms of the compression rate and quality although at the same time the number and the size of the files captured is constantly increasing, at the same time as the quality requirements of the users.

SUMMARY OF THE INVENTION

The purpose of the invention is therefore to provide a method for optimising the storage and/or the quality of a digital file, while still retaining sufficient compatibility.

A method according to the invention, for the digital encoding of a first raw medium, is characterised in that it comprises:
  a step for the capture of said raw medium, said raw medium being an audio and/or image and/or video medium.
  a step for encoding said raw medium into a first file, in a proprietary format; then,
  a step for re-encoding said first file into a second file in a compatible format;

Such a method is particularly advantageous when an application or a sharing is not compatible with the proprietary format.

The raw medium can be a raw representation of data in the working memory and/or the internal memory of an apparatus; it can also be contained in a raw file.

According to another object of the invention, a digital apparatus according to the invention comprises means for implementing a method according to the invention. Such an apparatus comprises image capturing means and/or audio capturing means and/or video capturing means.

Such an apparatus can in particular be a digital camera (DC), a portable telephone, in particular a smartphone, a digital tablet, a camera or a dictaphone.

As absolute compatibility is illusory, in this description, "compatible format" refers to a format that has a greater or different compatibility than that of the proprietary programme.

Several methods of executing the invention shall be described hereinafter, by way of non-restrictive examples, in reference to the annexed drawings wherein the sole figure diagrammatically shows a method according to the invention.

DETAILED DESCRIPTION OF THE PREFERRED EMBODIMENTS

Figure 1:
FIGS. 1 to 4 each show a mode for implementing a respective method according to the invention.

Each method according to the invention shall be described in its application to the photograph using a digital apparatus. Currently, the compatible compression format, noted as C in the figures, that is most commonly used for images is the jpeg format; of course, the method according to the invention applies to any compatible format.

In order to benefit from high-performance compression rates at the same time as a high quality in terms of the image restored, a so-called proprietary compression format, noted as P in the figures, is implemented in the apparatus. In the drawings, the capturing of the picture is symbolised by the drawing of a camera.

According to the invention, and in order to preserve as much as possible the memory of the apparatus while still retaining an excellent image restitution quality, in the examples shown, each photo captured is immediately and systematically encoded in the form of a digital file in the proprietary format P. However, as a proprietary format, the proprietary format P is hardly or is not compatible with the applications and software of the viewing type, provided by other publishers. As such, when the operator selects an image in format P, for example in order to process it with a non-compatible application or to transmit it to another device, the apparatus processes the image in such a way as to re-encode it into a compatible format C.

A first embodiment for such a method shall now be described, in reference to FIG. 1. In this example, prior to the encoding in the proprietary format P, the operator chooses an encoding quality Qp for said proprietary format P; prior to the encoding into the compatible format C, the operator also chooses an encoding quality Qc for said format compatible C.

Figure 2:

In a second embodiment, shown in FIG. 2, the encoding quality Qp in the proprietary format is not chosen; as such, the proprietary encoding P is systematically done according to a fixed quality. This is particularly advantageous if the encoding is of high performance in terms of the compression rate while still retaining high quality for the restored image; this is the case with lossless encodings. In this embodiment only the quality Qc of the compatible encoding Qc is chosen.

Figure 3:

In a third embodiment, shown in FIG. 3, the encoding quality Qc is not chosen in the compatible format; only the quality Qp of the proprietary encoding P is chosen. As such, the quality Qc of the restored image in the compatible format can be determined automatically by the apparatus according to the quality Qp chosen for the proprietary format.

Figure 4:
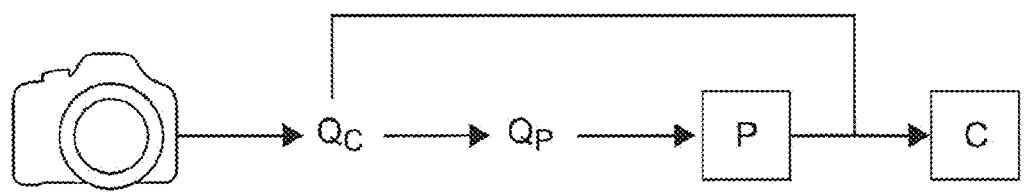

In a fourth embodiment, shown in FIG. 4, the quality Qc that will have to be restored during the sharing with an application that is not compatible with the format P is chosen as soon as the picture is taken. The apparatus then automatically determines the quality Qp of the proprietary format Qp which will make it possible to obtain a file of equivalent quality and of lesser size. When shared with a non-compatible application, the file is re-encoded into the compatible format C with the quality Qc.

In the second, third and fourth embodiments, the combined use of a proprietary format at the same time as a compatible format can be entirely transparent; with the user choosing the quality, without worrying about, and even without knowing that the apparatus uses several formats, with the apparatus taking care of providing the user with an image in the correct format according to the needs of the user.

The choice of a quality is generally made between three: high, medium or low, or alternatively excellent, high and medium. This choice can be made each time a picture is taken for the quality Qp of the proprietary format P or the quality Qc of the compatible format C that will have to be restored, and/or at each selection of a previously encoded image in the proprietary format for the quality Qc of the compatible format. However, more preferably, the choice is made using a configuration menu, and this choice remains valid pour all of the pictures taken, as long as the corresponding configuration has not been modified.

Thanks to a method according to the invention, the apparatus is able to automatically optimise the use of one format or another, with the proprietary format used to store files, and the compatible format used only when this is necessary. As such, more preferably, the version stored in proprietary format P of a file is stored unchanged and only a copy is made in the compatible format C, when necessary, with this copy being advantageously destroyed when it is no longer used, in order to avoid needlessly using the memory of the apparatus.

Of course, the invention is not limited to the examples that have just been described.

As such, a similar method can also be used to capture sounds or a video.

Also, instead of the encoding of each capture, audio, photo or video, being systematically carried out in a proprietary format, it can be provided that this encoding be carried out after a choice from the operator of the proprietary encoder to the detriment of a directly compatible encoding.

In a general public embodiment, it can be provided that the choice of quality not be made by the operator. As such, the quality can be frozen, regardless of the photo captured, or, the quality be determined automatically by the apparatus, according to original pre-established criteria.

Passing into a compatible format can be done upon request from the operator; however, for general public apparatuses, passing from a proprietary format is done automatically, when the operator uses an application available on the apparatus and which requires the compatible format, and systematically when the operator wants to export the image to another apparatus, for example a computer or a printer.

The invention claimed is:

1. A method for digital encoding of a raw image medium, comprising:
   a first step of using a digital camera to capture said raw image medium;
   a second step of retrieving a quality (Qc) for restoring of a file in a compatible format (C) from a set of predefined qualities (Qc) in the compatible format (C),
   wherein the set of predefined qualities (Qc) in the compatible format (C) includes at least the first quality (Qc) in the compatible format (C) and a second quality (Qc) in the compatible format (C),
   wherein, prior to said second step, a respective encoding quality (Qp) in a proprietary format (P), from a plurality of different encoding qualities (Qp) in the proprietary format (P), has been associated with each quality (Qc) in the set of predefined qualities (Qc) in the compatible format (C) such that at least i) a first encoding quality (Qp) is associated with the first quality (Qc) in the compatible format (C) and ii) a second encoding quality (Qp) is associated with the second quality (Qc) in the compatible format (C);
   a third step of selecting one encoding quality (Qp) of said plurality of different encoding qualities (Qp) in the proprietary format (P), wherein said selected one encoding quality (Qp) in the proprietary format (P) is associated with the quality (Qc) retrieved in the second step;
   a fourth step of encoding said raw image medium into a first file, with the raw image medium encoded in the selected one encoding quality (Qp) in the proprietary format (P); then,
   a fifth step of re-encoding said first file into a second file in the compatible format (C) in the quality (Qc) retrieved in the second step, in order that a file restored from the second file, using the compatible format (C), is of the quality (Qc) retrieved in the second step and the file restored is of quality equivalent to what would have been had the second file been encoded directly into the compatible format (C) according to the quality (Qc) retrieved in the second step.

2. The method according to claim 1, wherein the raw image medium is a raw representation of image data stored in the working memory and/or the internal memory of an apparatus.

3. The method according to claim 1, wherein the raw image medium is contained in a raw file.

4. A digital apparatus which comprises the digital camera and means for implementing the method according to claim 1.

* * * * *